United States Patent
Kriwet et al.

(10) Patent No.: US 6,840,152 B2
(45) Date of Patent: Jan. 11, 2005

(54) ACTUATING MEANS

(75) Inventors: Ansgar Kriwet, Ostfildern (DE); Bernd Lorenz, Baltmannsweiler (DE)

(73) Assignee: Festo AG & Co., Esslingen (DE)

( * ) Notice: Subject to any disclaimer, the term of this patent is extended or adjusted under 35 U.S.C. 154(b) by 188 days.

(21) Appl. No.: 10/220,926

(22) PCT Filed: Feb. 10, 2001

(86) PCT No.: PCT/EP01/01468
§ 371 (c)(1),
(2), (4) Date: Sep. 6, 2002

(87) PCT Pub. No.: WO01/66959
PCT Pub. Date: Sep. 13, 2001

(65) Prior Publication Data
US 2003/0029312 A1 Feb. 13, 2003

(30) Foreign Application Priority Data
Mar. 8, 2000 (DE) .................... 200 04 326 U

(51) Int. Cl.⁷ .............................. F15B 15/10
(52) U.S. Cl. .................. 92/90; 92/91; 92/92
(58) Field of Search ............... 92/90, 91, 92

(56) References Cited
U.S. PATENT DOCUMENTS

| | | | | |
|---|---|---|---|---|
| 2,483,088 A | * | 9/1949 | De Haven ........... | 92/92 |
| 3,645,173 A | * | 2/1972 | Yarlott ............... | 92/92 |
| 4,108,050 A | | 8/1978 | Paynter | |
| 4,751,869 A | | 6/1988 | Paynter | |
| 4,819,547 A | * | 4/1989 | Kukolj ............... | 92/92 |
| 4,841,845 A | * | 6/1989 | Beullens ........... | 92/92 |
| 5,019,121 A | | 5/1991 | Krauter | |
| 5,090,297 A | | 2/1992 | Paynter | |
| 5,185,932 A | | 2/1993 | Caines | |

FOREIGN PATENT DOCUMENTS

| | | |
|---|---|---|
| DE | 298 16 100 U1 | 11/1988 |
| DE | 299 08 008 U1 | 7/1999 |
| EP | 01 161 750 B1 | 11/1985 |

* cited by examiner

Primary Examiner—Edward K. Look
Assistant Examiner—Igor Kershteyn
(74) Attorney, Agent, or Firm—Hoffmann & Baron, LLP

(57) ABSTRACT

A fluid power operable actuating device, which possesses a flexible contractible tube extending between two spaced head pieces, such flexible contractible tube being caused to expand radially when its inner space is subjected to fluid pressure and transmitting simultaneously axial forces, due to contraction, to the head pieces. The flexible contractible tube comprises an elastically deforming flexible tube body which has a special geometrical shape having a cross sectional outline on the inner periphery and/or the outer periphery of the flexible tube body which is non-circular and/or is in the form of several portions of the body of the flexible tube with properties of the material of the flexible tube body which are different from one another.

15 Claims, 1 Drawing Sheet

ACTUATING MEANS

This application is the U.S. National Phase of International Application Number PCT/EP/01/01468 filed on Feb. 10, 2001, which claims priority to German Application No. 20004326.9 filed on Mar. 8, 2000, which is incorporated herein by reference.

BACKGROUND OF THE INVENTION

1. Field of the Invention

The invention relates to an actuating means able to be activated by fluid power comprising a flexible contractible tube extending between two spaced apart head pieces, which on being acted upon by fluid in its interior space undergoes radial expansion and thereby simultaneously transmits axial forces, due to contraction, to the head pieces, the flexible contractible tube comprising an elastically deforming flexible tube body, which has supporting means for contributing to increasing it strength and/or to force transmission.

2. Description of the Prior Art

Actuating means of this type may for instance perform the function of drives, in which case they are able to be employed as an alternative to conventional fluid power cylinders. In the case of a design indicated in the European patent publication 0 161 750 B1 two head pieces are connected by a flexible contractible tube, which comprises an elastomeric flexible tube body and furthermore a fabric-like strand structure, which coaxially surrounds the flexible tube body. The strand structure provides a supporting means, which increase the strength of the flexible contractible tube while simultaneously optimizing the transmission of the contraction forces to the head pieces. If the inner space of the flexible contractible tube is subjected to fluid under pressure, there will be a radial expansion, and the head pieces are moved toward one another, such movement being able to be employed for the actuation of any desired components and/or means.

Without the supporting means contributing to increasing strength and/or to the transmission of force, in the case of a flexible tube body of elastomerically deforming material there would be the problem that same would radially expand under the action of pressure, and would not cause an sufficient transmission of tension forces to the head pieces and furthermore in the case of an excessive action of pressure the there would be the danger of bursting. On the other hand there are limits as regards the design of the strand structure serving as a support, if the actuating means is below a certain overall size. In the case of a embedding strand structure in the flexible tube body's material, as is indicated for example in the German patent publication 29,908,008 (utility model), there is no possibility of dealing with such problems.

OBJECT AND SUMMARY OF THE INVENTION

Consequently one object of the present invention is to provide an actuating means of the type initially mentioned which in the case of need renders possible a design with an extremely small overall size.

In order to achieve such object there is a provision such that the supporting means are in a form with a special geometrical shape having a cross sectional outline on the inner periphery and/or the outer periphery of the flexible tube body which is non-circular and/or such supporting means are in the form of several portions of the body of the flexible tube with properties of the material of the flexible tube body which are different from one another.

This means that it is possible to do without any strand fabric surrounding the flexible tube body or embedded in the flexible tube body, since owing to the particular configuration of the flexible tube body and/or owing to the particular local specification of the material properties of the flexible tube body the necessary support can be achieved for increasing the strength and/or for transmission of force.

On the basis of prior art, in the case of which the flexible tube bodies always have a tubular shape, it is possible for the supporting means may be provided in one of the possible alternative designs of the invention by a particular geometry, a non-circular cross sectional outline being provided for the inner periphery and/or the outer periphery. In the case of other alternatives in accordance with the invention the flexible tube body has several regions, in which the properties of the flexible tube body's material differ from one another, for example by having different strengths. The two alternative designs may also be adopted simultaneously in the case of one and the same flexible tube body.

Further advantageous developments of the invention are defined in the dependent claims.

For the provision of the supporting means the flexible tube body may be already manufactured originally in a special, desired geometry so that it consists of prefabricated flexible tube body material, which preferably has homogeneous material properties. It is also possible to provide certain portions of the body of the flexible tube in which flexible tube body material, originally still present, is removed by, for example, mechanical and/or thermal treatment, or on which for maintaining the desired properties, there is an application of flexible tube body material.

Particularly advantageous shapes provide for a corrugated or grooved and/or polygonal outline at the inner and/or outer periphery of the flexible tube body.

In order to obtain the desired supporting means the flexible tube body may have portions of the body of the flexible tube, whose properties are influenced by radiation. Moreover, it is possible for embrittled and/or fully vulcanized portions of the body of the flexible tube to be provided in-order to endow the flexible tube body material systematically with particularly elastic properties.

A further advantageous possibility for the design of the supporting means is such that the flexible tube body is made up of a composite of several material components, the properties of the material components being predetermined to achieve the desired property of the flexible contractible tube. Thus the flexible tube body may for example be in the form of an extruded body, which comprises a plurality of simultaneously extruded material components. The flexible tube body may comprise a hose-like material component with a suitable structure or grain and which is provided with at least one further material applied by coating or printing. In the case of such dual component or multi-component connections it is possible to obtain the material properties in a particularly satisfactory manner.

Owing to the supporting means there is more particularly also the possibility of predetermining the kinetic behavior of the flexible contractible tube when subjected to pressure, for example in order to produce a plain axial movement, a plain rotary movement or a hybrid rotary and linear movement. In order to ensure a constant operational behavior it is in any case advantageous for the particular shaping measures and/ or the portions of the body of the flexible tube with different material properties to be arranged with a regular arrangement in the peripheral direction of the flexible tube body.

More particularly, it is possible for the flexible tube body material to possess a plurality of strip-like portions of the body of the flexible tube, serving as supporting means, extending between the two head pieces, which strip-like portions are less extensible in the longitudinal direction than the remaining flexible tube body material. The supporting means preferably extend without interruption along the entire length of the flexible tube body.

BRIEF DESCRIPTION OF THE DRAWING

In the following the invention will be explained with reference to accompanying drawings.

DETAILED DESCRIPTION OF THE PREFERRED EMBODIMENTS

Figure 1:
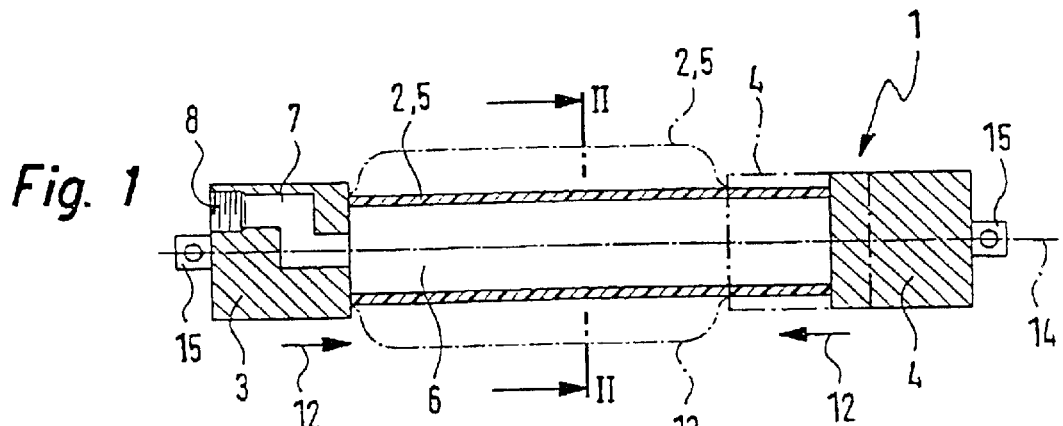
FIG. 1 shows a first embodiment of the actuating means in accordance with the invention in a diagrammatic longitudinal section in the deactivated state, chained lines indicating an active state with the subjection of the flexible contractible tube to an internal pressure.

The actuating means 1, which is illustrated highly diagrammatically, comprises two head pieces 3 and 4 arranged with a distance between them which are permanently connected together by a hollow body termed a flexible tube or hose body 2. The flexible contractible tube 2 consists of an elastically deforming, fluid-tight flexible tube body 5, which between the two head pieces 3 and 4 defines a continuous inner space 6 and has its two axial terminal section attached in a sealing manner respectively to one of the two head pieces 3 and 4. The attachment may for instance be performed in a clamping operation, as is for example described in the said European patent publication 0 161 750 B1. Other types of attachment would also be possible.

Into the interior space 6 delimited by the flexible tube body 5 and the two head pieces 3 and 4 there opens at least one fluid duct 7, which extends through one of the head pieces 3 and whose outer end is provided with a connection means 8, by way of which the one fluid duct coming from a pressure source may be connected. In conjunction with an associated control valve arrangement there is accordingly the possibility of supplying a fluid pressure medium through the fluid duct into the inner space 6 or to let off such fluid therethrough. It will be clear in this connection that the supply and venting of the pressure medium could also be by way of separate fluid ducts.

The actuating means 1 may be operated with a gaseous or aa hydraulic fluid, as for instance with compressed air or water.

In full lines FIG. 1 shows the deactivated state of the actuating means, the inner space 6 being pressure-free. The flexible contractible tube 2 or, respectively, the flexible tube body 5 in this case assumes a configuration, in the case of which it has at least essentially constant cross sectional dimensions along the entire length thereof. If the actuating means is activated, that is to say space 6 is subjected to a gage pressure, the flexible tube body 5 will expand radially and by contraction will simultaneously transfer axial forces to the head pieces 3 and 4 so that same are pulled together in the directions 12 as indicated by arrows. The configuration or shape then assumed by the flexible tube body 5 is indicated in chained lines in FIG. 1 at 13.

If the actuating means is deactivated by cutting the gage pressure in the inner space 6, the head pieces 3 and 4 will move back in the an opposite axial direction owing to the elastic return force of the flexible tube body 2 in the starting position indicated in full lines. The desired or suitably matched supply of fluid or removal of fluid may therefore take place with an axial stroke of the head pieces 3 and 4 in relation to one another.

It is furthermore possible to utilize a customized design of the flexible contractible tube 2 to produce an exclusive or hybrid relative rotary movement between the two head pieces 3 and 4 in relation to the longitudinal axis 14 of the actuating means.

Each head piece 3 and 4 can be provided with attachment means 15 of some suitable design, on which components or means may be fixed, which as part of the above mentioned motion means of the head pieces 3 and 4 are to be shifted in relation to one another. Thus for example one of the head pieces 3 could be fixed to the holding structure of a machine and the other head piece could be secured to a component of the said machine which is to be shifted in relation to the holding structure.

The flexible contractible tube 2 or, respectively, the flexible tube body 5 is inherently so designed so that supporting means are present, which contribute to increasing the strength of the flexible tube body as such and/or to optimizing force transmission from the flexible tube body 5 to the two head pieces 3 and 4. Differing from the prior art in accordance with the said European patent publication 0 161 750 B1 or in accordance with the said German patent publication 29,908,00 such supporting means are free of a separate fabric structure and relate exclusively to the shape and/or material properties of the flexible tube body. This renders possible the manufacture of extremely small or miniaturized actuating means, which owing to the lack of availability of textile or fabric fibers could not be produced with correspondingly small dimensions in the manner of manufacture which had so far been conventional. The basic principle of the invention is that the material of the sensor itself is changed or affected in its physical properties and/or in the selected configuration in order to then to achieve the strength necessary in operation as a substitute for fabric.

FIGS. 2 through 6 indicate different alternative possibilities by way of example of providing a flexible tube body 5 in which the desired supporting means are inherent.

Figure 2:
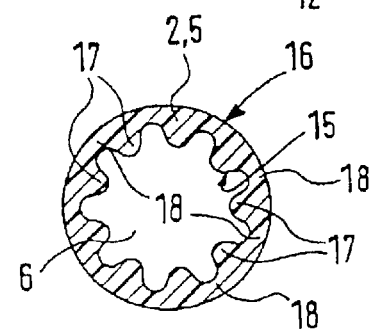
FIGS. 2 to 6 show various different designs of the flexible contractible tube in a cross section taken on the line II—II of FIG. 1.
Figure 3:
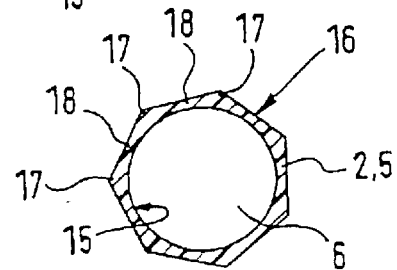

The designs according to FIGS. 2 and 3 are characterized in that the supporting means are produced with a special geometry of the shape having a non-circular outline on the inner periphery 15 and/or the outer periphery 16 of the flexible tube body 5. Whereas the flexible tube body in conventional actuating means is tubular and both on the inside and on the outside has a circular outline, the flexible tube body 5 in accordance with FIG. 2 has an inner periphery 15 which is non-circular, there being a corrugated or grooved outline. The outer periphery 16 is still circular in configuration, something which facilitates cleaning.

In the case of the working example of FIG. 3 the flexible tube body 5 is provided with a circularly cylindrical inner periphery 15, whereas the outer periphery 16 has a special geometry, that is to say a polygonal one.

Owing to such a design there are, considered along the overall length of the flexible tube body 5, for first individual portions 17 of the body of the flexible tube, which in the peripheral direction of the flexible tube body 5 are preferably arranged with a regular distribution and which have a smaller extensibility in the longitudinal direction than the second portions 18 of the body of the flexible tube provided to alternate with the first portions, the radial thickness dimensions thereof being smaller than those of the other portions 17 of the body of the flexible tube.

It will be clear that a geometry other than a circular one could be provided both on the inner periphery and also on the outer periphery of the flexible tube body 5.

The geometry of the flexible tube body 5 in accordance with FIGS. 2 and 3 may for example simply be produced by initially manufacturing the flexible tube body with a particular configuration so that flexible tube body material will be available from the start. Such flexible tube body material may itself then have homogenous material properties.

An other possibility of manufacture is such that the second portions 18 of the body of the flexible tube with a smaller wall thickness are obtained by mechanical and/or thermal treatment to remove material from the originally cylindrical flexible tube body material. As an alternative to this thicker wall portions of the flexible tube body could be produced by the application of a flexible tube body material.

It would be feasible as well to produce the desired configuration by embossing with suitable forming tools.

Figure 4:
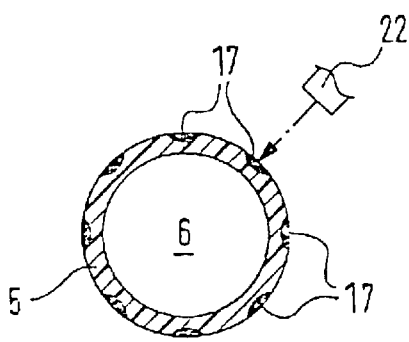
Figure 5:
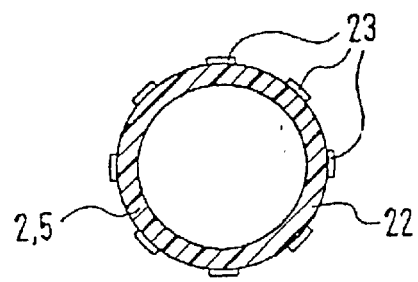
Figure 6:
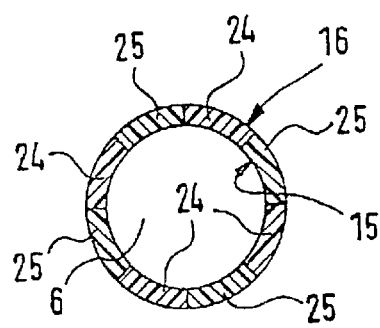

In the case of the working examples of FIGS. 4 through 6 all or most of the portions of the body of the flexible tube are produced by manufacturing the flexible tube body 5 with a plurality of portions of the body with different material properties of the material thereof.

In the case of working example of FIG. 4 the flexible tube body 5 has been locally subjected to radiation in the course of manufacture using a diagrammatically indicated source of radiation or using some other means and embrittled and/or completely vulcanized so that first portions 17 of the body of the flexible tube result extending along the full length of the flexible tube body, in which portions the flexible tube body material, which otherwise has elastomeric properties, is stiffer or stronger than the remaining flexible tube body material, which is still elastically deformable. Owing to this flexible tube body material it is possible to ensure that the flexible tube body 5 can still expand radially when its inner space is put under pressure, but owing to the first portions 17 of the body of the flexible tube having a higher strength in the longitudinal direction there will be an optimum transmission of force to the head pieces 3 and 4 so that they may be driven to perform the above mentioned relative movement.

The measures affecting the material properties are also preferably provided regularly about the periphery of the flexible tube body 5.

In the working embodiment illustrate in FIG. 5 the flexible tube body 5 possesses a material component 22 with a hose-like structure and preferably having elastomeric properties, which is coated on the outer face with at least one further material component 23 and/or has such a component printed on it. These further material components 23 may be provided with any conceivable distribution, something also applying for the portions of the body of the flexible tube present in the case of the other working embodiments so that the flexible tube body 5 may be systematically provided with specific properties as regards deformation.

For the further material components 23 applied the same material can be employed as for the material component 22 with a hose-like structure so that as a result a special geometry is obtained, which is responsible for the supporting means. As an alternative however the further material components 23 are preferably manufactured of a material, whose properties differ from those of the material component 22 with a hose-like structure, more particularly owing to same having a greater stiffness or, respectively, a lower elasticity, while at the same time having a greater tensile strength.

In the working embodiment illustrated in FIG. 6, as was the case with the embodiment of FIG. 5, the flexible tube body 5 is manufactured from several material components joined together as a composite structure, although however a somewhat different shape has been selected. Thus in this case the flexible tube body 5 comprises several material components 24 and 25 simultaneously extruded during manufacture, which during extrusion are intimately connected together so that there is the impression of a uniform material of the flexible tube body. Because material components 24 and 25 are employed having different physical properties, it is possible to produce the desired supporting means in an extremely simple fashion In the case of the specific-working example of FIG. 6 the different material components 24 and 25 respectively occupy the full wall thickness of the flexible tube body 5 and are therefore fully formed from the outer periphery 16 as far as the inner periphery 15 of the flexible tube body 5, whereas for example in the case of the design of FIG. 4 only superficial portions constitute the first portions 17 of the body of the flexible tube. Again it is expedient here to provide the different material components 24 and 25 with a regular distribution in the peripheral direction of the flexible tube body 5.

What is claimed is:

1. An actuating means able to be activated by fluid power comprising: a flexible contractible tube extending between two spaced apart head pieces, which on being acted upon by fluid in its inner space undergoes radial expansion and thereby simultaneously transmits axial forces, due to contraction, to the head pieces, the flexible contractible tube consisting essentially of an elastically deforming flexible tube body without any additional strand means surrounding or embedded in the tube body, the tube body having a geometrical shape having a cross sectional outline on the inner periphery and/or the outer periphery of the flexible tube body which is non-circular.

2. The actuating means as set forth in claim 1, characterized in that to obtain the geometrical shape, the flexible tube body comprises a prefabricated homogeneous flexible tube body material.

3. The actuating means as set forth in claim 1, characterized in that to obtain the geometrical shape, the flexible tube body comprises portions of the body of the flexible tube, at which flexible tube body material has been removed from the flexible tube body.

4. The actuating means as set forth in claim 1, characterized in that to obtain the geometrical shape, the flexible tube body comprises portions at which flexible tube body material has been applied.

5. The actuating means as set forth in claim 1, characterized in that internally and/or externally the flexible tube body has an at least partly corrugated and/or polygonal cross section.

6. An actuating means able to be activated by fluid power comprising:

a flexible contractible tube extending between two spaced apart head pieces, which on being acted upon by fluid in its inner space undergoes radial expansion and thereby simultaneously transmits axial forces, due to contraction, to the head pieces, the flexible contractible tube comprising an elastically deforming flexible tube body, which has supporting means for contributing to increasing its strength and/or to force transmission, characterized in that the supporting means are in a form with a geometrical shape having a cross sectional outline on the inner periphery and/or the outer periphery of the flexible tube body which is non-circular and/or such supporting means are in the form of several portions of the body of the flexible tube with properties of the material of the flexible tube body which are different from one another, wherein, for producing different material properties, portions of the body of the flexible tube are provided which are modified by radiation.

7. An actuating means able to be activated by fluid power comprising a flexible contractible tube extending between two spaced apart head pieces, which on being acted upon by fluid in its inner space undergoes radial expansion and thereby simultaneously transmits axial forces, due to contraction, to the head pieces, the flexible contractible tube consisting essentially of an elastically deforming flexible tube body without any additional strand means surrounding or embedded in the tube body, the tube body having at least two portions with different material properties.

8. The actuating means as set forth in claim 7, wherein the flexible tube body comprises embrittled or fully vulcanized portions.

9. The actuating means as set forth in claim 8, wherein the flexible tube body material is made up of a plurality of material components having different material properties.

10. The actuating means as set forth in claim 7, wherein the flexible tube body comprises a plurality of composite material components.

11. The actuating means as set forth in claim 10, wherein the flexible tube body is constituted by several jointly extruded material components as a composite extrusion.

12. The actuating means as set forth in claim 10, wherein the flexible tube body comprises a material component with a hose-like structure and includes at least one further material component applied by coating and/or embossing.

13. The actuating means as set forth in claim 7, wherein the different properties of the flexible tube body's material are due to different degrees of stiffness and/or elasticity and/or tensile strength.

14. The actuating means as set forth in claim 7, wherein the portions of the body of the flexible tube with different material properties are arranged in the peripheral direction of the flexible tube body with a regular distribution.

15. The actuating means as set forth in claim 7, wherein the flexible tube body's material possesses a plurality of strip-like portions extending between the two head pieces, such strip-like portions having a lower extensibility than the remaining flexible tube body material.

* * * * *